(12) United States Patent
Graves

(10) Patent No.: US 6,519,255 B1
(45) Date of Patent: Feb. 11, 2003

(54) UNIVERSAL OPTICAL NETWORK UNIT FOR USE IN NARROWBAND AND BROADBAND ACCESS NETWORKS

(75) Inventor: Alan F. Graves, Kanata (CA)

(73) Assignee: Nortel Networks Limited, St-Laurent (CA)

(*) Notice: Subject to any disclaimer, the term of this patent is extended or adjusted under 35 U.S.C. 154(b) by 0 days.

(21) Appl. No.: 09/217,898

(22) Filed: Dec. 22, 1998

(51) Int. Cl.[7] .......................... H04L 12/28; H04L 12/66
(52) U.S. Cl. ...................... 370/392; 370/463; 359/152
(58) Field of Search ................................. 370/230, 235, 370/236.2, 282, 389, 392, 353, 401, 431, 471, 474, 463, 464, 490, 535, 536, 538, 539; 359/113, 115, 118, 124, 125, 137, 152; 725/105, 116, 119, 129

(56) References Cited

U.S. PATENT DOCUMENTS

| | | | |
|---|---|---|---|
| 4,408,189 A | 10/1983 | Betts et al. | 340/347 |
| 4,528,550 A | 7/1985 | Graves et al. | 340/347 |
| 5,189,671 A * | 2/1993 | Cheng | 370/94.1 |
| 5,303,229 A * | 4/1994 | Withers et al. | 370/58.1 |
| 5,572,347 A | 11/1996 | Burton et al. | |
| 5,864,415 A * | 1/1999 | Williams et al. | 359/125 |
| 5,894,477 A * | 4/1999 | Brueckheimer et al. | 370/353 |
| 5,903,372 A * | 5/1999 | Czerwiec | 359/125 |
| 5,917,815 A * | 6/1999 | Byers et al. | 370/352 |
| 6,023,467 A * | 2/2000 | Abdelhamid et al. | 370/395 |

FOREIGN PATENT DOCUMENTS

| | | |
|---|---|---|
| EP | 0 782 367 A2 | 7/1997 |
| WO | WO 97/18649 | 5/1997 |

OTHER PUBLICATIONS

DSC Communications, 1997; www.dsccc.com (Internet).
Doshi, Bharat T., et al. "A Broadband Multiple Access Protocol for STM, ATM, and Variable Length Data Services on Hybrid Fiber–Coax Networks." Bell Labs Technical Journal, Bell Laboratories, US, vol. 1, N° 1, Jun. 21, 1996 (Jun. 21, 1996) pp. 36–65, XP000635761.

* cited by examiner

Primary Examiner—Huy D. Vu
Assistant Examiner—Duc Ho

(57) ABSTRACT

The invention is an optical network unit (ONU) connectable between an optical fiber and a plurality of twisted pairs, the optical fiber carrying downstream traffic elements from a host digital terminal (HDT) to the ONU, each downstream traffic element having a header and a body, the header indicating a destination twisted pair and a service type associated with the traffic element. The ONU comprises means for determining, from the header of each traffic element, the service type associated with the traffic element; means for determining, from the header of each traffic element, the destination twisted pair associated with the traffic element; and means for processing the traffic elements and transmitting at least the body of each traffic element to the associated destination twisted pair in a data format dependent on the associated service type.

58 Claims, 8 Drawing Sheets

UNIVERSAL OPTICAL NETWORK UNIT FOR USE IN NARROWBAND AND BROADBAND ACCESS NETWORKS

CROSS-REFERENCES TO RELATED APPLICATIONS

The subject matter of this application is related to that of U.S. patent application Ser. No. 09/056,096 (Graves et al.) filed on Apr. 7, 1998, which issued as U.S. Pat. No. 6,198,558 on Mar. 6, 2001 and U.S. patent application Ser. No. 09/084,370 (Graves et al.) filed on May 27, 1998, which issued as U.S. Pat. No. 6,229,788 on May 8, 2001, both of which are incorporated by reference herein.

FIELD OF THE INVENTION

The present invention relates to fiber optic telecommunications access networks and, in particular, to a novel optical network unit and host digital terminal for use in such networks.

BACKGROUND OF THE INVENTION

The development of telecommunications access network architectures for delivering narrowband and broadband services from a central office straight into subscribers' homes has been prompted by the public's growing demand both for broadband applications, such as Web browsing and teleconferencing, and for more traditional narrowband services, such as telephony.

In certain kinds of access networks, known as "fiber-to-the-neighbourhood" (FTTN) or "fiber-to-the-curb" (FTTC) networks, a host digital terminal (HDT) is typically used for delivering the various communications services to customer premises equipment (CPE) via a communications path that is part optical fiber and part copper twisted pair. Optical network units (ONUs) are used for interfacing between optical fibers connected to the HDT and sets of twisted pairs connected to the CPE at each subscriber's home.

Currently, different types of ONUs are used depending on whether the communications service to be delivered is of the narrowband or broadband variety. For example, a specialized narrowband ONU may perform the conversion of mu-law compressed voice samples arriving from the HDT into linear samples for delivery to a customer's telephone. In another scenario, the narrowband ONU may be required to convert DS-1 digital data arriving from an analog modem at the customer premises into a cell-based data structure to be delivered to the HDT.

From these and many other conceivable examples, it is apparent that a narrowband ONU must perform various complex processing tasks. Traditionally, this is achieved with the aid of mission-specific or service-specific line cards, although the number of line card types can be reduced by the deployment of powerful digital signal processing (DSP) engines on some or all of the line cards to allow them to adapt their functions, thereby to provide a wider range of service types. Still, conventional narrowband ONUs have severe drawbacks, such as high cost, high power consumption, low reliability and overall large physical volume.

Some of the disadvantages of a conventional narrowband ONU can be mitigated by simplifying its design. This has been recognized in above-mentioned U.S patent application Ser. No. 09/056,096, which discloses a line card structure that considerably streamlines a narrowband ONU by relegating the majority of the complex, service-specific and power-hungry signal processing operations to the HDT.

A completely different type of ONU is required when contemplating the delivery of broadband services (based on, e.g., asynchronous transfer mode-ATM or Internet protocol-IP), which are typically asynchronous and packet-based. In this case, problems arise when the peak data rate demanded by a particular subscriber exceeds the data rate available on an individual copper drop leading to that subscriber's CPE. Similarly, it is not uncommon for the aggregate data rate transmitted by multiple subscribers to exceed the bandwidth available on the fiber leading to the HDT. In both situations, data is caused to accumulate in the ONU, usually leading to an unacceptable delay and/or loss of data.

One technique used to help prevent bottlenecks from appearing at a broadband ONU consists of installing memory buffers ("queues") in the ONU for storing excess data until it can be delivered. The buffer size required to safeguard against data loss is a function of the peak bandwidth demand as well as the duration of such a demand. However, neither of these two parameters is controllable, leading to the installation of very long queues in the ONU for handling an estimated worst-case scenario. Furthermore, it is necessary to implement a complex and power-intensive queueing structure in order to avoid the situation in which higher priority traffic elements (e.g., cells) are "trapped" among lower priority traffic elements within the queue.

As with narrowband ONUs, some of the disadvantages of conventional broadband ONUs can also be mitigated by simplifying the ONU design. For instance, above-mentioned U.S. patent application Ser. No. 09/084,370 discloses a method of controlling traffic flow at the HDT which allows the use of queues in the ONU that are significantly reduced in size and complexity, again diminishing the ONU's cost, complexity and power requirements.

Thus, in accordance with U.S. patent applications Ser. Nos. 09/056,096 or 09/084,370, either narrowband or broadband services can be delivered by a small, simplified ONU. However, neither ONU is capable, on its own, of delivering both narrowband and broadband services simultaneously. Specifically, the improved narrowband ONU disclosed in U.S. patent application Ser. No. 09/056,096 does not address the traffic control problems associated with the delivery of broadband services, while the improved broadband ONU disclosed in U.S. patent application Ser. No. 09/084,370 is ill-equipped to accommodate the signal-processing demands associated with the delivery of narrowband services.

Therefore, in order to deliver a service mix containing both narrowband and broadband services, current access systems must rely on the use of two separate types of ONUs. These may be packaged in a single, larger unit or installed separately and linked in a passive optical network or ring configuration. Unfortunately for the telecommunications service provider, either option doubles the manufacturing costs associated with the access network and significantly increases the required installation effort.

As can be appreciated, there is clearly a need for a universal ONU that is capable of delivering both narrowband and broadband services.

SUMMARY OF THE INVENTION

It is an object of the present invention to mitigate or obviate one or more disadvantages of the prior art.

Therefore, the invention may be summarized according to a first broad aspect as an optical network unit (ONU) connectable between an optical fiber and a plurality of twisted pairs, the optical fiber carrying data between a host digital terminal (HDT) and the ONU, the data consisting of broadband and narrowband data destined for the twisted pairs in a downstream direction and originating from the twisted pairs in an upstream direction, the ONU comprising: interface circuitry for connection to the optical fiber, for receiving a downstream optical signal on the optical fiber and for extracting a downstream data stream therefrom; a demultiplexer connected to the interface circuitry, for receiving the downstream data stream from the interface circuitry and controllably separating it into a plurality of downstream broadband data streams destined for respective ones of the twisted pairs and a plurality of downstream narrowband data streams also destined for respective ones of the plurality of twisted pairs; and for each twisted pair: a respective broadband processing unit connected to the demultiplexing means, comprising circuitry for receiving the respective downstream broadband data stream from the demultiplexer and converting it into a respective downstream broadband analog signal destined for said twisted pair; a respective narrowband processing unit connected to the demultiplexing means, comprising circuitry for receiving the respective downstream narrowband data stream from the demultiplexer and converting it into a respective downstream narrowband analog signal destined for said twisted pair; and a respective combiner connected to the respective broadband and narrowband processing units and connectable to the twisted pair, comprising circuitry for combining the respective downstream broadband analog signal and the respective downstream narrowband analog signal into a respective downstream composite analog data signal destined for said twisted pair.

According to a second broad aspect, the invention may be summarized as an optical network unit (ONU) connectable between an optical fiber and a plurality of twisted pairs, the optical fiber carrying data between a host digital terminal (HDT) and the ONU, the data consisting of broadband and narrowband data destined for the twisted pairs in a downstream direction and originating from the twisted pairs in an upstream direction, the ONU comprising: interface circuitry for connection to the optical fiber, for receiving a downstream optical signal on the optical fiber and for extracting a downstream data stream therefrom; a demultiplexer connected to the interface circuitry, for receiving the downstream data stream from the interface circuitry and separating it into a plurality of intermediate downstream broadband data streams for connection to a downstream broadband processing pool and a plurality of downstream narrowband data streams destined for respective ones of the plurality of twisted pairs; a downstream broadband processing pool connected to the demultiplexer, comprising processing means for processing the intermediate downstream broadband data streams received from the demultiplexer and a cross-connect for selectably routing the processed intermediate downstream broadband data streams to a plurality of downstream broadband data streams destined for respective ones of the plurality of twisted pairs; and for each twisted pair: a respective broadband processing unit connected to the downstream broadband processing pool demultiplexing means, comprising circuitry for receiving the respective downstream broadband data stream from the downstream broadband processing pool and converting it into a respective downstream broadband analog signal destined for said twisted pair; a respective narrowband processing unit connected to the demultiplexing means, comprising circuitry for receiving the respective downstream narrowband data stream from the demultiplexer and converting it into a respective downstream narrowband analog signal destined for said twisted pair; and a respective combiner connected to the respective broadband and narrowband processing units and connectable to the twisted pair, comprising circuitry for combining the respective downstream broadband analog signal and the respective downstream narrowband analog signal into a respective downstream composite analog data signal destined for said twisted pair.

The invention may be summarized according to a third broad aspect as a method of transmitting data received on an optical fiber to a plurality of twisted pairs, the data arriving on the optical fiber as a series of downstream traffic elements, each downstream traffic element having a header and a body, the header indicating a destination twisted pair and a service type associated with the traffic element, the ONU comprising: determining, from the header of each traffic element, the service type associated with the traffic element; determining, from the header of each traffic element, the destination twisted pair associated with the traffic element; and processing the traffic elements and transmitting at least the body of each traffic element to the associated destination twisted pair in a data format dependent on the associated service type.

According to another broad aspect, the invention may be summarized as an optical network unit (ONU) connectable between an optical fiber and a plurality of twisted pairs, the optical fiber carrying downstream traffic elements from a host digital terminal (HDT) to the ONU, each downstream traffic element having a header and a body, the header indicating a destination twisted pair and a service type associated with the traffic element, the ONU comprising: means for determining, from the header of each traffic element, the service type associated with the traffic element; means for determining, from the header of each traffic element, the destination twisted pair associated with the traffic element; and means for processing the traffic elements and transmitting at least the body of each traffic element to the associated destination twisted pair in a data format dependent on the associated service type.

The invention may be summarized according yet another broad aspect as an access network, comprising: a host digital terminal for processing downstream data destined for an optical network unit and transmitting the downstream data thereto as a series of downstream traffic elements on an optical fiber, each downstream traffic element having a header and a body, the header indicating at least one destination twisted pair from a plurality of twisted pairs and a service type associated with the traffic element; an optical network unit (ONU) connected to the HDT by the optical fiber and connectable to the.plurality of twisted pairs, the ONU comprising: means for determining, from the header of each traffic element, the service type associated with the traffic element; means for determining, from the header of each traffic element, the at least one destination twisted pair associated with the traffic element; and means for processing the traffic elements and transmitting at least the body of each traffic element to the at least one associated destination twisted pair in a data format dependent on the associated service type.

BRIEF DESCRIPTION OF THE DRAWINGS

The preferred embodiments of the present invention will now be described with reference to the following figures, in which.

DETAILED DESCRIPTION OF THE PREFERRED EMBODIMENTS

HIGH-LEVEL SYSTEM DESCRIPTION

Figure 5:
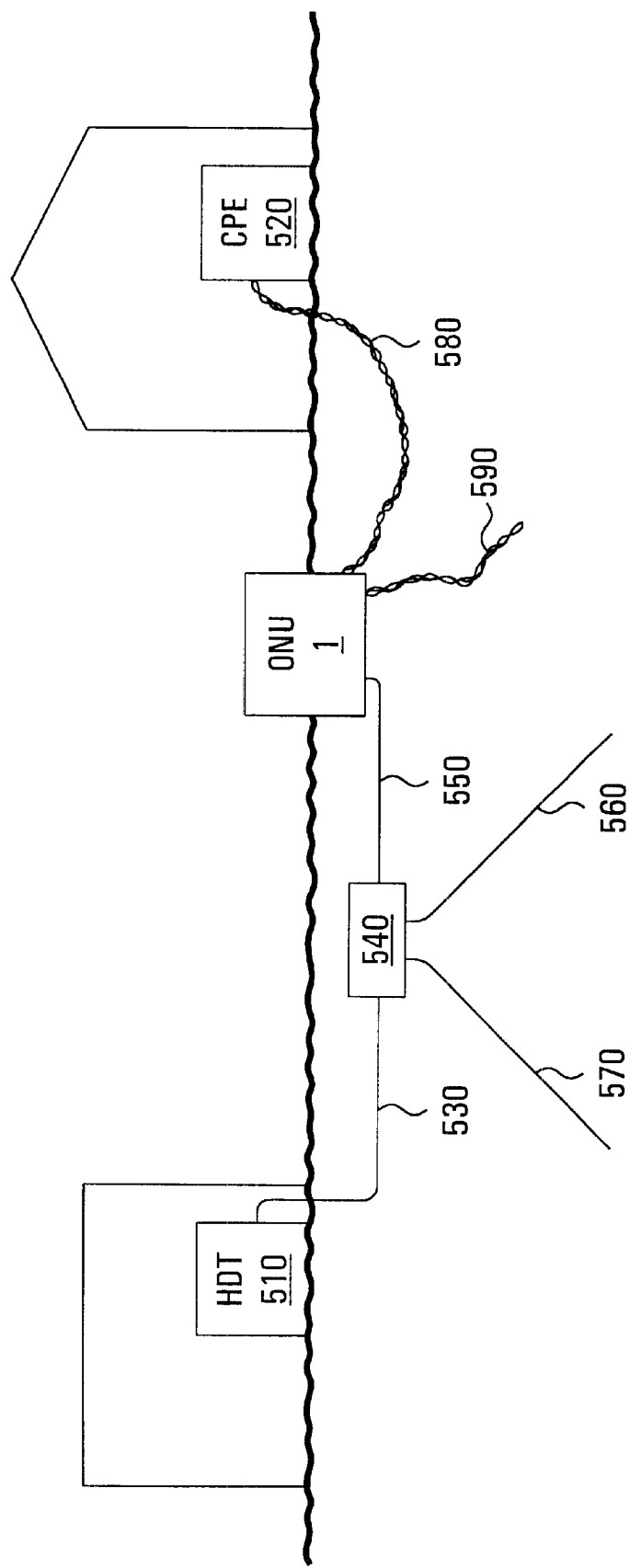
FIG. 5 illustrates a schematic diagram of an access network.

With reference to FIG. 5, there is shown a schematic view of a simple access system comprising an inventive host digital terminal (HDT) 510 connected to customer premises equipment (CPE) 520 via an inventive universal optical network unit (ONU) 1. The CPE 520 is of standard design and generally consists of filters, converters, narrowband equipment (e.g., analog or digital telephones, ISDN modems) and broadband equipment (e.g., broadband modems).

The path between the HDT and the ONU is all-optical and consists of a fiber umbilical 530 connected at one end to the HDT 510 and at another end to a passive optical splitter 540. The passive optical splitter 540 then branches out into several optical fibers 550,560,570, one of which (fiber 550) leads to ONU 1. ONU 1 is connected to the CPE 520 via a copper twisted pair 580 and to other CPEs (not shown) via other twisted pairs, one of which (twisted pair 590) is shown in FIG. 5.

The arrangement of the HDT 510, ONU 1 and other ONUs not shown in FIG. 5 is known as a passive optical network (PON) and is the preferred interconnection topology. Nevertheless, it is to be appreciated that the HDT 510 may be connected to each ONU via an individual point-to-point link, thereby obviating the need for an optical splitter. Alternatively, the HDT 510, ONU 1 and other ONUs not shown in FIG. 5 could be interconnected in a ring configuration using SONET or SDH signalling.

In a PON arrangement, such as that shown in FIG. 5, separate optical fibers may be used for "downstream" (HDT to ONU) and "upstream" (ONU to HDT) communication, although preferably a single optical fiber carries both upstream and downstream traffic in accordance with one of many known multiplexing techniques, such as time compression multiplexing (TCM) or wavelength division multiplexing (WDM). Moreover, it should be appreciated that the present invention can be applied to a unidirectional communications scenario in which downstream data, e.g., a television channel, is broadcast by the HDT 510 to multiple CPEs via the ONU, in which case it is relevant to consider only those components and methods used for processing downstream traffic.

Figure 6:
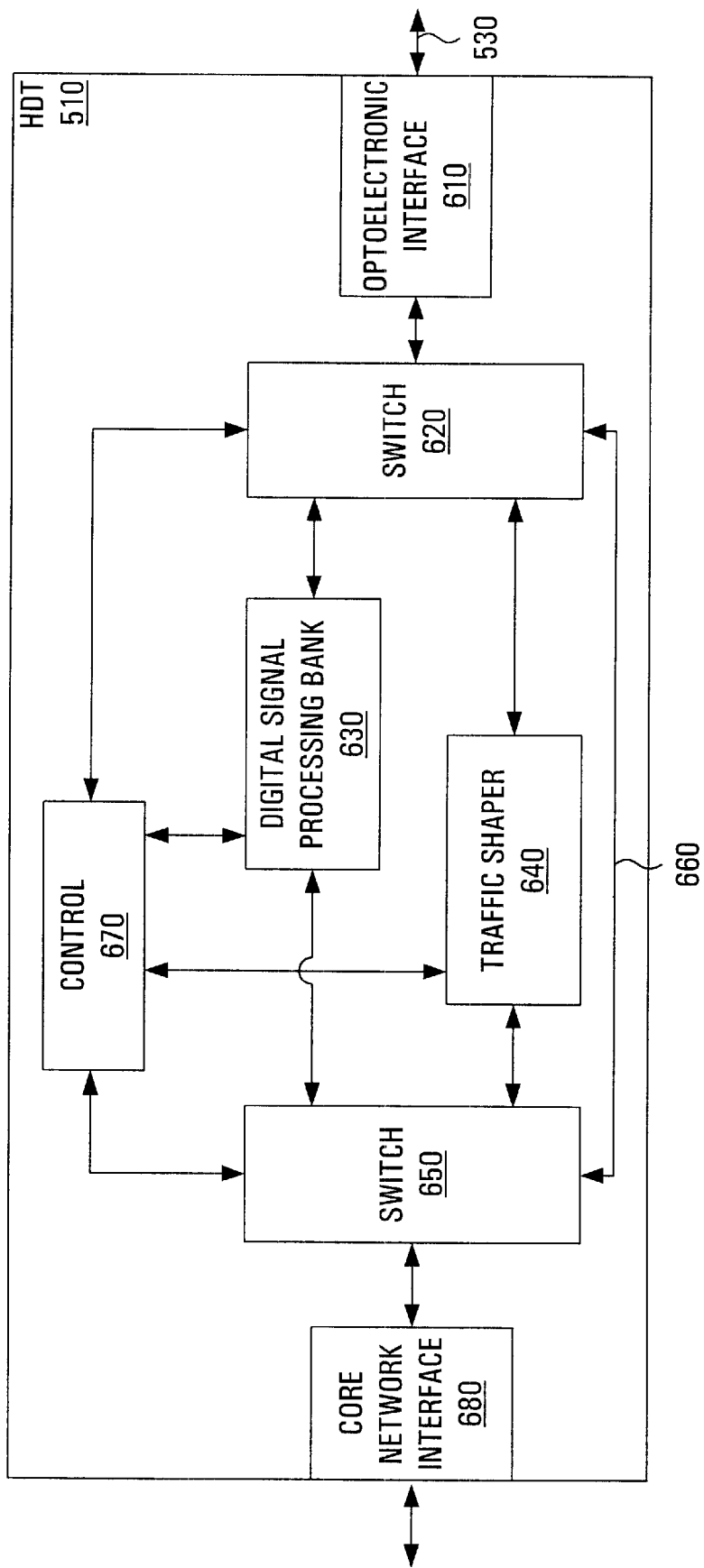
FIG. 6 is a block diagram of an HDT for use in the access network of FIG. 5.
Figure 7:
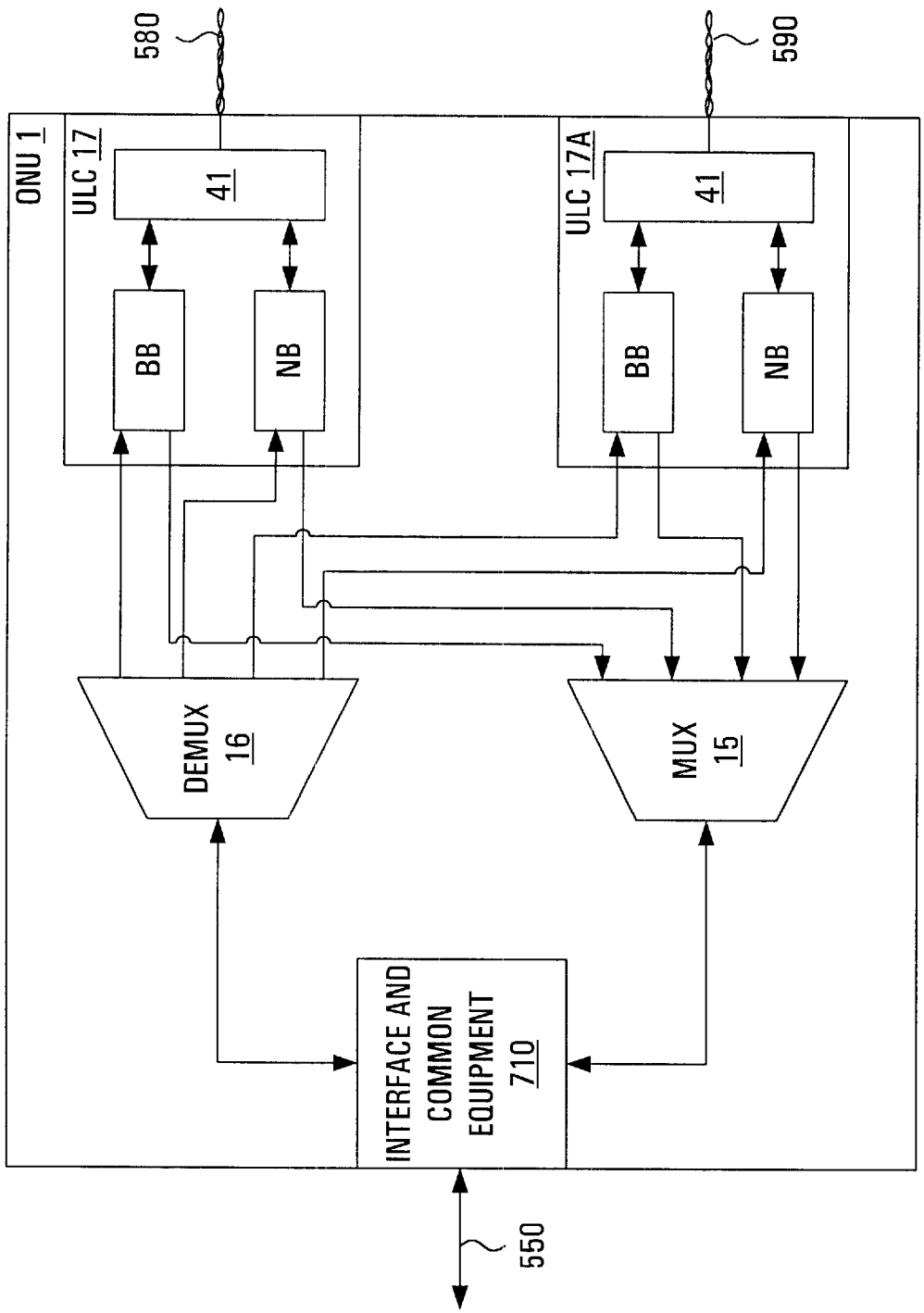
FIG. 7 is a simplified block diagram of an ONU for use in the access network of FIG. 5.

The HDT 510 and ONU 1 are shown in simplified block diagram form in FIGS. 6 and 7, respectively. With reference first to FIG. 7, the ONU 1 can be generically described as comprising an optoelectronic interface and common equipment block 710 connected to fiber 550, to a demultiplexer 16 (for separating downstream traffic) and to a multiplexer 15 (for combining upstream traffic). As will be shown in further detail later on, the optoelectronic interface and common equipment block 710 comprises an optoelectronic transceiver for interfacing with fiber 550, as well as circuitry for recovering a clock from received downstream data, a downstream outstation for redirecting selected downstream data to the demultiplexer and an upstream outstation for organizing upstream data into a suitable format for upstream transmission to the HDT 510.

The ONU 1 also comprises a plurality of universal line circuits (ULCs), among which only ULCs 17 and 17A are shown in FIG. 7. ULCs 17,17A are each connected to the demultiplexer 16 and to the multiplexer 15, and also interface with respective twisted pairs 580,590. Each ULC 17,17A comprises a broadband processing section BB for performing residual modem functions, a narrowband processing section NB for performing residual analog/digital functions as well as combiner circuitry 41 for performing interfacing functions with the corresponding twisted pair.

With reference now to FIG. 6, the HDT 510 comprises an optoelectronic interface 610 for interfacing with the fiber umbilical 530, a first digital switch 620 connected to the optoelectronic interface 610, a digital signal processing bank 630 and a traffic shaper 640 both connected between digital switch 620 and a second digital switch 650, a "hairpin" connection 660 linking the digital switches 620,650, a control processor 670 connected to the digital switches 620,650, to the digital signal processing bank 630 and to the traffic shaper 640, as well as a core network interface 680 connected to the second digital switch 650, for interfacing with a core network (not shown), which may be circuit-switched or packet-switched.

The data format exchanged between the core network interface 680 and the core network itself may consist of ATM cells, IP packets, time-division-multiplexed data or any other data format, while the data format exchanged between the optoelectronic interface 610 and the interface and common equipment block 710 in the ONU 1 preferably consists of so-called "frames".

Figure 4:
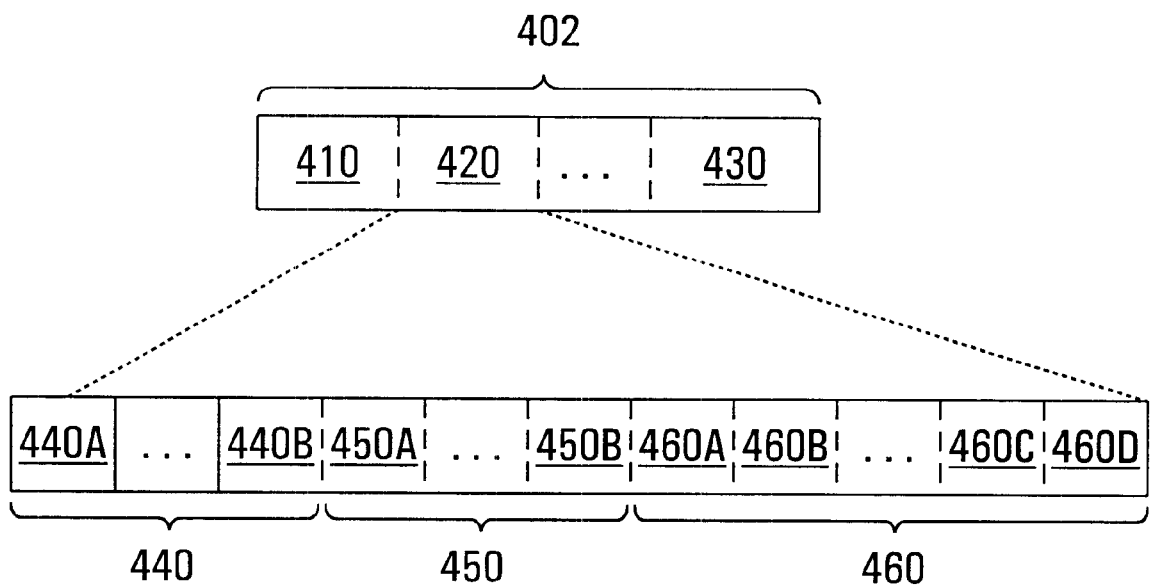
FIG. 4 illustrates the preferred frame structure for use with the present invention.

With reference to FIG. 4, a typical downstream frame 402 emitted by the optoelectronic interface 610 is composed of a plurality of subframes 410,420,430 of various sizes, each subframe being destined for a corresponding ONU sharing the PON. Although not illustrated in FIG. 4, it is to be appreciated that an upstream frame containing subframes originating from the various ONUs will be similarly formatted except that the subframes will typically be separated by guard bands to allow tolerance of round-trip burst delays.

Each subframe 410,420,430 and, in particular, the expanded subframe 420, consists of an address field 440, a control field 450 and a traffic field 460, each field preferably consisting of transport cells (e.g., ATM cells or IP packets) each having a header and a body. Those skilled in the art will appreciate that the address, control or traffic fields could also comprise a time-division multiplexed component that is shared among various ONUs or among various narrowband or broadband circuits within a particular ONU. Nevertheless, it is assumed for the sake of simplicity that the address, control and traffic fields are comprised solely of transport cells.

The address field 440 consists of one or more transport cells 440A . . . B uniquely identifying the destination ONU in the case of a downstream frame or the source ONU in the case of an upstream frame. The control field 450 also consists of one or more transport cells 450A . . . B which could carry, in the downstream direction, information such as ring generation commands, a new virtual circuit mapping for a cross-connect or a demultiplexer within an ONU or instructions for coordinating the transmittal of upstream subframes by the ONUs sharing the PON. In the case of an upstream frame, the control field may contain loop status information or a request for additional bandwidth as made by an ONU.

The traffic field 460 preferably consists of a plurality of transport cells 460AB . . . CD destined for (or originating from) the various CPEs connected to the various copper twisted pairs serviced by the ONU. The size of the traffic field 460, and therefore the size of the corresponding ONU's downstream or upstream subframe, will be proportional to the aggregate bandwidth of the narrowband and broadband services being delivered by that ONU. Typically, certain ones of the traffic transport cells, or simply "traffic cells", will be broadband cells while others will be narrowband cells.

In accordance with the present invention, the significance of the header and body of each transport cell 460AB . . . CD in the traffic field 460 of a given subframe 420 depends on whether the service associated with the cell is of the broadband or narrowband type and whether the direction of traffic flow is upstream or downstream.

Narrowband:

With regard to downstream narrowband traffic cells, each cell contains an over-sampled bit stream in its body, which over-sampled bit stream may be destined for a particular CPE or may be intended to be broadcast to all CPEs. The cell's header, however, is not intended to be delivered to the destination CPE. Typically, the header of a downstream narrowband cell will identify the ULC associated with the destination CPE or will consist of a special code if it is associated with a broadcast service.

An upstream narrowband traffic cell analogously comprises a header identifying the source address of the ULC associated with the originating CPE along with a body containing over-sampled data.

Broadband:

Having regard now to broadband traffic cells, the contents of each cell's header and body depends on the design of the ONU; the remainder of the detailed description deals in particular with two preferred embodiments.

Specifically, in accordance with the first preferred embodiment of the invention, the header of a downstream broadband traffic cell arriving from the HDT contains the virtual circuit (VC) address of a destination CPE. The body of a downstream broadband traffic cell contains binary information destined for the destination CPE. Both the header and the body of the downstream broadband traffic cell are to be modulated "as is" by the ONU. The header and body of an upstream broadband traffic cell contain a demodulated binary version of a symbol stream transmitted by the CPE.

In accordance with the second preferred embodiment of the invention, the header of a downstream broadband traffic cell is not intended to be delivered to the CPE but must nevertheless be delivered to the associated ULC. Therefore, it contains the address of the ULC associated with the destination CPE. The body of a downstream broadband traffic cell contains a series of n-bit commands for controlling the analog output level of the ONU, where n>1 and where each n-bit command represents the encoded cell stream to the destination CPE, including the VC address thereof. The body of an upstream broadband traffic cell contains a sampled version of the possibly distorted CPE output containing entire line coded customer-generated cells, while the header is inserted locally to the ONU by the ULC connected to the originating CPE.

Before providing a detailed description of the ONU, it is useful to describe, with reference to FIG. 6 in particular, how the HDT processes upstream frames received from the ONU and how the HDT generates downstream frames received from the core network.

In the upstream case, the optoelectronic interface 610 in the HDT receives frames such as those illustrated in FIG. 4 across fiber umbilical 530. Subframes are extracted from the incoming frames (after removal of guard bands), then the transport cells in the address field in each subframe is extracted and used by the optoelectornic interface 610 to modify the mapping of digital switch 620. The transport cells in the control field of the upstream subframes are extracted and used by the optoelectronic interface 610 to control the digital signal processing bank 630 and the traffic shaper 640 via control lines (not shown in FIG. 6).

The traffic cells in each upstream subframe are then sent by the optoelectronic interface 610 to digital switch 620, where they are routed in accordance with a mapping that is modifiable in the just described manner. The upstream traffic cells are generally routed by digital switch 620 towards the digital signal processing bank 630, where the processing operations performed on a given upstream traffic cell depend on whether the cell is associated with a narrowband service or with a broadband service, and in the latter case, the processing operations will also depend on the format of the cell.

For example, if the cell is a narrowband upstream traffic cell, then the operations performed by the digital signal processing bank 630 may include, in a first stage: header removal; then in a second stage, decimation of the over-sampled data output by the CPE; then in a third stage: format conversion from, e.g., PCM to mu-law; and in a fourth stage: formatting the converted data into cells for delivery across the core network. There may be dedicated processors in the digital signal processing bank 630 for executing this four-stage processing operation or there may be parallel banks for each stage and the partially processed data may, under the control of the control processor 670, be rerouted to the digital signal processing bank 630 via the second digital switch 650 and the hairpin connection 660.

If the cell arriving at the digital signal processing bank 630 is a broadband upstream traffic cell, and if it is formatted in accordance with the first embodiment of the invention as described herein, then the operations performed by the digital signal processing bank 630 may be minimal, since the header and body of each cell are the actual data cells intended to be received at the HDT 510. The digital signal processing bank may therefore be responsible, if necessary, for the simple task of changing the format of the received upstream traffic cells into a different format for transmission through the core network.

On the other hand, if the upstream broadband traffic cell has a format in accordance with the second preferred embodiment of the invention, then the headers must be removed by the digital signal proessing bank 630. Since the bits in the body of each cell represent only the samples of the data output by the originating CPE, a demodulation or decoding function must be executed on these bits to recover the originally transmitted symbols. Furthermore, the originally transmitted symbols may have to be re-packetized by the digital signal processing bank into a format suitable for transmission across the core network. Again, these processing operations may be operated by dedicated processors in the digital signal processing bank, although it is preferable to use a simpler bank of parallel processors linked by the hairpin connection 660.

In the downstream direction, the data in the narrowband traffic elements received from the core network by the core network interface 680 must be formatted into the body of downstream cells by the digital signal processing bank 630. On the other hand, broadband traffic elements are controllably delayed by the traffic shaper 640 prior to processing by the digital signal processing bank 630. The traffic shaper must also account for the fiber bandwidth of the downstream signal sent to the ONU, which will differ depending on the format of the downstream broadband traffic cells.

For example, broadband traffic may be required to be delivered intact (first preferred embodiment) or it may have to be pre-line coded or pre-modulated by the digital signal processing bank 630 (second preferred embodiment) in order to generate a bit stream comprised of n-bit commands and then the bit stream would be placed into the body of downstream traffic cells sent across the PON by the optoelectronic interface 610. The latter option requires a slightly higher downstream fiber bandwidth but, as will be shown later, results in a simpler ONU.

DETAILED STRUCTURE OF THE UNIVERSAL ONU

Figure 1:
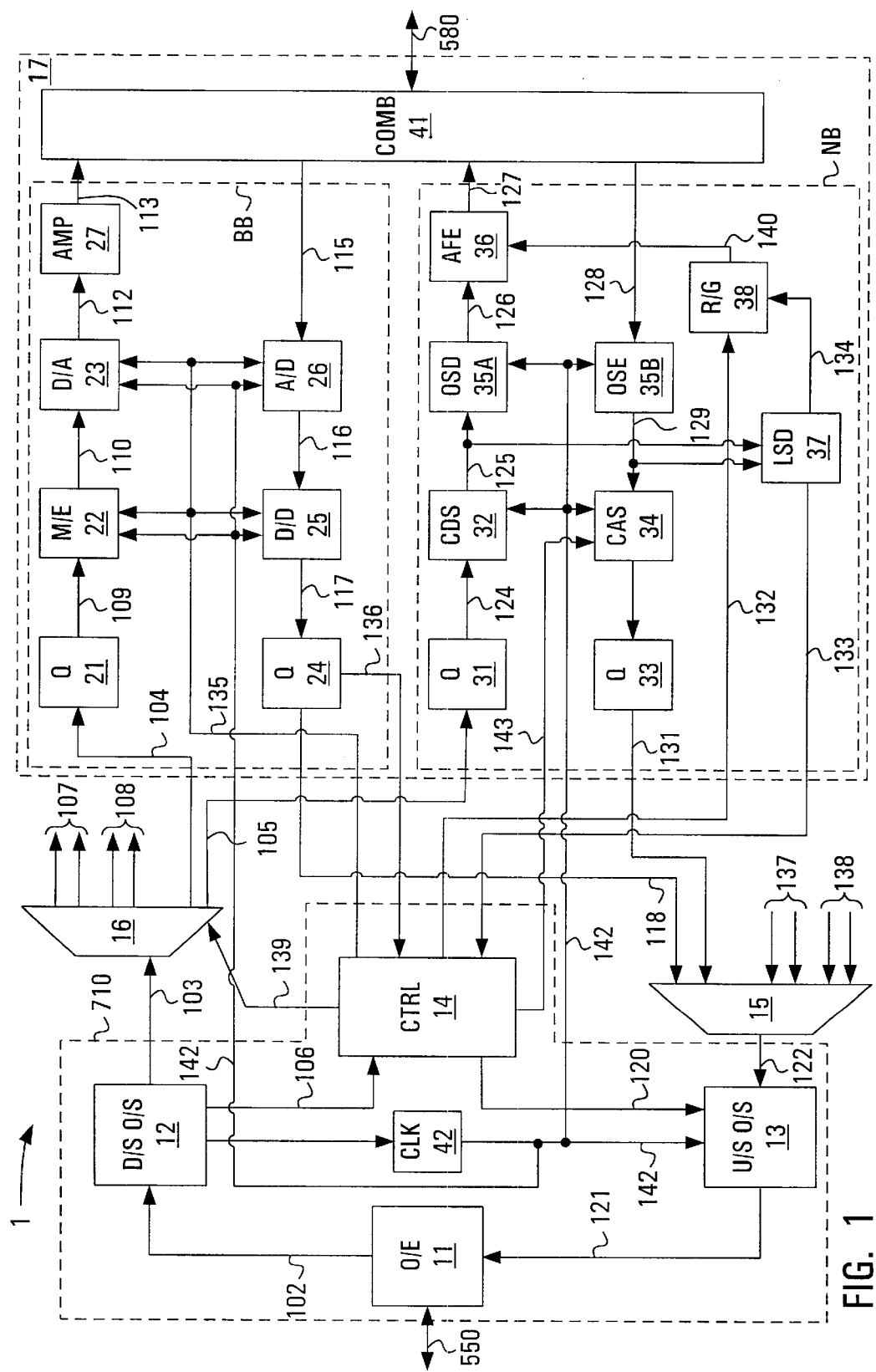
FIG. 1 is a block diagram of an ONU in accordance with a first preferred embodiment of the present invention.

Reference is now made to FIG. 1, which shows the first preferred embodiment of the universal ONU 1 in more detail. The interface and common equipment block 710 comprises an optoelectronic transceiver. (O/E) 11 having a bidirectional port connected to fiber 550, a downstream port from which emerges a downstream received electronic signal 102 leading to a downstream outstation (D/S O/S) 12 and an upstream port for accepting an upstream transmitted electronic signal 103 from an upstream outstation (U/S O/S) 13. The interface and common equipment block 710 further comprises a clock recovery circuit 42 having an input connected to the downstream outstation 12 and an output for sending a recovered clock signal 142 to the downstream outstation 13 and to various other parts of the ONU 1, as well as a control unit 14 accepting ONU control commands 106 from the downstream outstation 12 and providing a transmit control signal 120 to the upstream outstation 13. The control unit 14 may be a micro-processor, a microcontroller, a programmable digital signal processor (DSP) or any other programmable logic device (PLD).

Depending on the structure of the downstream subframes, demultiplexer 16 can be implemented as a pure ATM demultiplexer, a pure IP packet demultiplexer, a hybrid ATM/TDM demultiplexer or a hybrid IP/TDM demultiplexer. As previously discussed, the implementation is chosen to be purely cell-based for reasons of clarity. Therefore, the signal 103 output by the downstream outstation 12 to the demultiplexer is a downstream cell stream. Similarly, multiplexer 15 is implemented as a pure cell-based multiplexer, although it could be an IP packet multiplexer, a hybrid ATM/TDM multiplexer or an IP/TDM multiplexer.

The demultiplexer 16 is connected to a plurality of universal line circuits (ULCs), among which only ULC 17 is shown in FIG. 1. Specifically, the demultiplexer 16 creates a number of different cell streams from the downstream broadband cell stream 103 according to a selectable virtual circuit mapping controllable by a mapping selection signal 139 received from the control unit 14. In FIG. 1, the demultiplexer 16 feeds the broadband processing section BB in ULC 17 with a downstream broadband cell stream 104 and a feeds the narrowband processing section NB in ULC 17 with a downstream narrowband cell stream 105. The demultiplexer 16 feeds other ULCs with corresponding pairs of cell streams 107,108.

In the reverse direction, the broadband and narrowband processing paths of the ULC 17 supply the multiplexer 15 with respective upstream cell streams 118,131 which are combined by the multiplexer 15 with other pairs of cell streams 137,138 received from other ULCs to give a single upstream cell stream 122 fed to the upstream outstation 13. The upstream outstation 13 converts the upstream cell stream 122 into the upstream transmitted electronic signal 121 fed to the optoelectronic converter 11. The upstream outstation 13 may delay sending the upstream cell stream 122 to the optoelectronic transceiver 11 on the basis of the transmit control signal 120 received from the control unit 14. This requires the presence of a first-in-first-out (FIFO) queue in the upstream outstation 13, whose properties are determined by the ONU-to-HDT transmission link design (and not by the service mix travelling therethrough).

Each ULC is structurally identical to ULC 17, the broadband and narrowband processing sections of which will be described later on in further detail. The broadband processing section BB feeds the combiner circuitry 41 with a downstream broadband analog signal 113 and receives an upstream broadband analog signal 115 therefrom, while the narrowband processing section NB feeds the combiner circuitry 41 with a downstream narrowband analog signal 127 and receives an upstream narrowband analog signal 128 therefrom.

Figure 8:
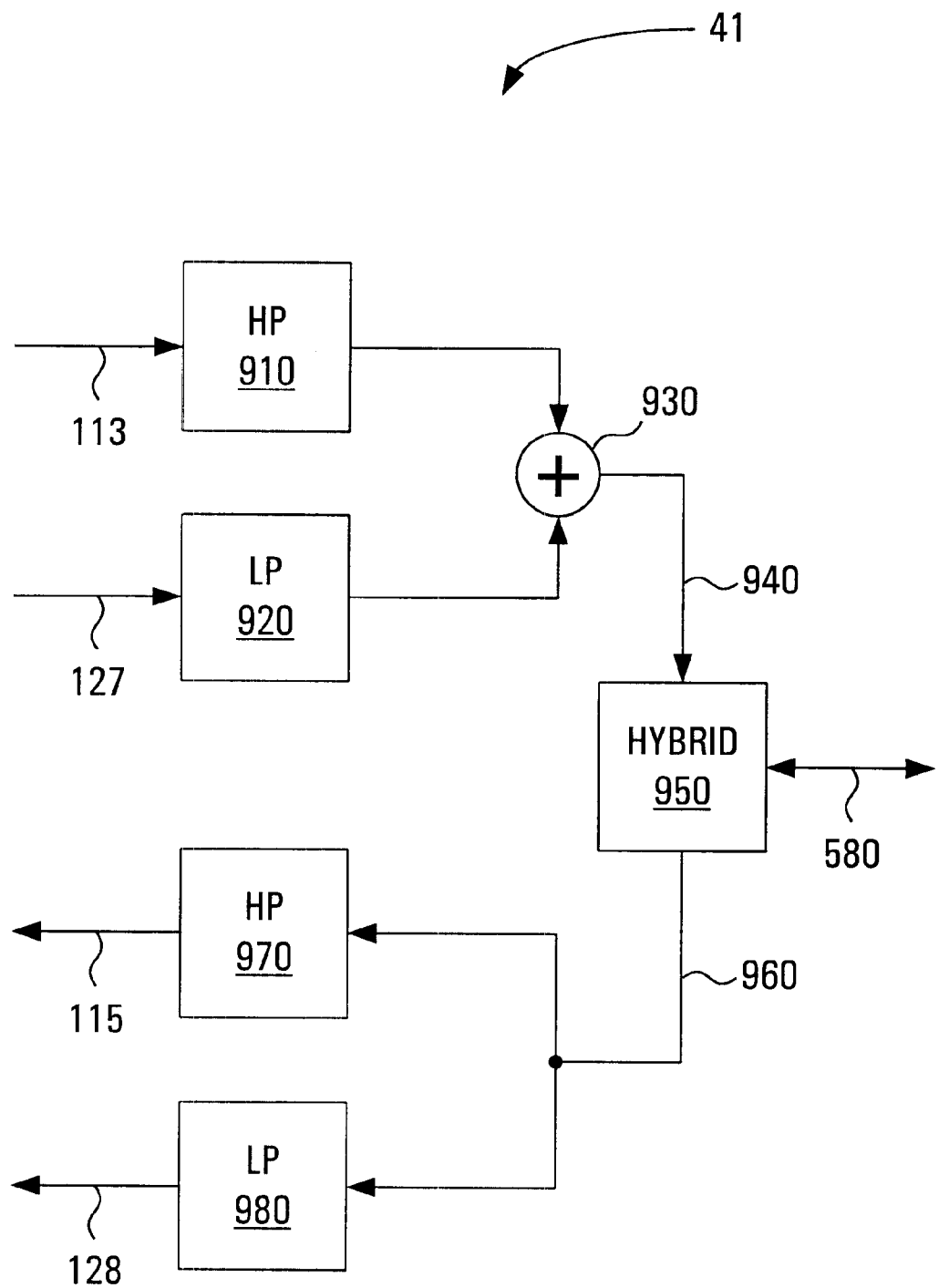
FIG. 8 is a block diagram of combining circuitry for use with ONUs in accordance with the present invention.

The combiner circuitry 41 consists of filtering and diplexing circuits, which allows upstream and downstream components to share the same twisted pair 580. The combiner circuitry 41 (or "combiner") can be implemented in many ways, the preferred manner being shown in FIG. 8. Thus, the combiner 41 is seen to comprise a high-pass filter 910 for accepting the downstream broadband analog signal 113, a low-pass filter 920 for accepting the downstream narrowband analog signal 127, a summing node 930 having two inputs respectively connected to the high-pass and low pass filters 910,920 and an output that produces a downstream signal 940 connected to an input port of a hybrid 950.

The hybrid 950 also has an output port producing an upstream signal 960 that leads both to a high-pass filter 970 producing the upstream broadband analog signal 115 and to a low-pass filter 980 producing the upstream narrowband analog signal 128. The hybrid 950 comprises diplexing means for combining the downstream and upstream signals 940,960 into a single composite bidirectional analog signal travelling on twisted pair 580 between the CPE 520 and an input-output port of the hybrid 950. In order for the frequency combiner 41 to be effective, the pass band of the high-pass filters 910,970 must be kept separate from the pass band of the low-pass filters 920,980.

In an alternate embodiment, the combiner circuitry 41 may comprise a broadband hybrid and a bidirectional high-pass filter associated with the broadband processing section BB, a narrowband hybrid and a bidirectional low-pass filter associated with the narrowband processing section NB, as well as diplexing means for allowing the two filtered signals to coexist on the same twisted pair 580. This alternative design of the combiner 41 has fewer filters but a greater number of combiners than the design of FIG. 8.

With continuing reference to FIG. 1, the broadband processing section BB comprises a downstream broadband de-jittering queue (Q) 21 for accepting the downstream broadband cell stream 104 from the demultiplexer 16 and removing residual multiplexing jitter caused by the arrival of more cells in a given time interval than can be processed by subsequent processing blocks in the broadband processing section BB. Because of the traffic shaping being performed by the broadband traffic shaping block 640 in the HDT 510, the number of cells arriving in the time span corresponding to a complete frame will always be amenable to processing by the subsequent processing blocks, thus the term "residual" multiplexing jitter. It is noted that the size of the downstream broadband de-jittering queue 21 is therefore dependent only on the number of cells per frame, which is a fixed quantity, and not on the broadband traffic type.

The downstream broadband de-jittering queue 21 produces a de-jittered downstream broadband cell stream 109 that is fed to a modulator/encoder (M/E) 22. The modulator/encoder 22 applies a line code or modulation scheme to the de-jittered downstream broadband cell stream 109, producing a multi-level downstream broadband sample stream 110 fed to a wideband digital-to-analog converter (D/A) 23. The wideband digital-to-analog converter 23 transforms the downstream broadband sample stream 110 into an analog signal 112 which is fed to and amplified by a line driver (amplifier) 27, becoming the downstream broadband analog signal 113 fed to the combiner circuitry 41.

In order to handle upstream data, the broadband processing section BB in the ULC 17 comprises a wideband analog-to-digital converter (A/D) 26, which accepts the upstream broadband analog signal 115 from the combiner circuitry 41 and converts it into an upstream broadband sample stream 116. A demodulator/decoder (DD) 25 demodulates or decodes the upstream broadband sample stream 116 and produces an upstream broadband cell stream 117 fed to an upstream broadband queue (Q) 24. Queue 24 buffers the upstream broadband cell stream 117 before delivering cell stream 118 to the multiplexer 15. Queue 24 also provides the control unit 14 with a queue fill control signal 136 indicating the level to which the queue 24 is full.

A control signal 135 leading from the control unit 14 may provide the modulator/encoder 22, demodulator/decoder 25, wideband digital-to-analog converter 23 and wideband analog-to-digital converter 26 with an indication of the modulation format or line code to be applied, while the clock recovery circuit 42 provides these components with timing information via the recovered clock signal 142.

The narrowband processing section NB in the ULC 17 comprises a downstream narrowband de-jittering queue (Q) 31 for temporarily storing the downstream narrowband cell stream 105 output by the demultiplexer 16. The output of the downstream narrowband de-jittering queue 31 is a de-jittered downstream narrowband cell stream 124 fed to a cell disassembly (CDS) block 32. The CDS block 32 removes the header from each cell in the de-jittered downstream narrowband cell stream 124 and produces a downstream narrowband raw bit stream 125, which is fed to an over-sampling decoder (OSD) 35A.

The over-sampling decoder 35A, preferably of the one-bit sigma-delta variety, is used in the downstream direction for transforming the downstream narrowband raw bit stream 125 into an analog signal 126 exhibiting incremental variations that are in the positive or negative sense based on the value of each bit in the downstream narrowband raw bit stream 125. Analog signal 126 is fed to an analog front end (AFE) 36, where it is combined with a ringing voltage waveform 140 and an appropriate loop drive DC current and sent to the combiner circuitry in the form of the narrowband downstream analog signal 127. The ringing voltage waveform 140 is supplied by a ringing generator (R/G) 38 which is responsive to a control signal 132 supplied by the control unit 14. The ringing generator 38 can be an autonomous 20, 25 or 16 ⅔ Hz generator, or it can be a power amplifier fed from the output of the over-sampling decoder 35A.

In the upstream direction, the upstream narrowband analog signal 128 received from the combiner circuitry 41 reaches an over-sampling encoder (OSE) 35B, where it is over-sampled and converted into an upstream narrowband raw bit stream 129. The upstream narrowband raw bit stream 129 enters a cell assembly block (CAS) 34, which organizes the arriving bits into the bodies of traffic cells that are fed to an upstream narrowband queue 33. The cell header address information as sent by the HDT 510 and decoded by the control unit 14 is fed to the CAS block 34 via a control signal 143. Queue 33 buffers the cell stream received from the CAS block 34, producing the upstream narrowband cell stream 131 that is fed to the ATM multiplexer 15.

Additional narrowband control functions are performed by a loop status detector (LSD) 37, which monitors the downstream narrowband raw bit stream 125 and the upstream narrowband raw bit stream 129 in order to determine the status (on-hook, off-hook) of the line. Thus, if a customer premises analog modem or telephone picks up during ringing, the ringing generator 38 can be instantly tripped by a ring-trip control signal 134 from the loop status detector 37. The status of the loop is fed by the loop status detector 37 to the control unit 14 in the form of a control signal 133.

Persons skilled in the art will recognize that various ONU components shown in FIG. 1 can be merged together. For example, the modulator/encoder 22 and the demodulator/decoder 25 may constitute a single component known as a modem or a codec, depending on the application. Also, the CDS block 32 and the CAS block 34 can be fused into a single segmentation-and-reconstruct (SAR) block. Furthermore, the over-sampling decoder 35A and over-sampling encoder 35B can be joined into a single over-sampling codec.

It is also possible to implement the queues 21,24,31,33, the modulator/encoder 22, the demodulator/decoder 25, the CDS block 32, the CAS block 34 and the loop status detector 37 on a single chip which could share the same circuit board with other ULCs and the other components of the ONU 1 in FIG. 1. Moreover, multiplexer 15 and demultiplexer 16 may be hardware components controlled by the control unit 14 or they may be software elements of the same processor as that which accommodates the control unit 14. Moreover, a single, bidirectional mux/demux can perform the functions of the multiplexer 15 and demultiplexer 16.

OPERATION OF THE UNIVERSAL ONU

At the downstream outstation 12, the downstream received electronic signal 102 representing the received optical signal is converted internally into an intermediate digital signal, from which timing information is fed to the clock recovery circuit 42 and from which subframes containing transport cells are identified. The downstream outstation 12 in ONU 1 verifies the transport cells in the address field of each subframe against a locally stored address (either predetermined or downloadable from the HDT) to determine whether the subframe in question is destined that ONU. If so, then control information is extracted from the transport cells in the control field of the corresponding subframe and sent to the ONU control unit 14 as the ONU control commands 106. In addition, traffic cells containing data are extracted from the traffic field of the corresponding subframe and are sent to the demultiplexer 16 as the downstream cell stream 103.

The demultiplexer 16 reads the header of each traffic cell in the downstream cell stream 103 and, by comparing the cell address against either a fixed address map or an address map downloaded from the HDT via the control unit 14 and the mapping selection signal 139, determines the destination CPE and associated service type (narrowband or broadband). The demultiplexer 16 then consults the mapping and routes the incoming traffic cells towards the appropriate de-jittering queue (21 or 31) of the appropriate ULC in the form of the downstream broadband or narrowband cell stream (104 or 105).

Downstream operation of the broadband processing section is now discussed. In accordance with the first preferred embodiment of the invention, each traffic cell associated with a broadband service is passed intact to the CPE, and so the downstream fiber bandwidth occupied by a 25 Mb/s downstream service equals 25 Mb/s. Therefore, the entire contents of each cell in the downstream broadband cell stream 104 is to be line coded or modulated by the broadband processing section BB.

Specifically, the downstream broadband cell stream 104 is received by the downstream broadband de-jittering queue 21, which queue removes so-called "residual multiplexing jitter" as previously described. Specifically, queue 21 is required to store as many broadband cells as could arrive in a single frame transmitted by the HDT. By the time the next frame arrives at the ONU, all the cells previously in the queue 21 will have been processed by the subsequent broadband processing stages. The de-jittered downstream broadband cell stream 109 exits the downstream broadband de-jittering queue 21 and enters the modulator/encoder 22.

The modulator/encoder 22 may be hard coded in its functionality or it may be re-programmable to execute any one of a number of different line coding or carrier modulation functions required by the particular digital subscriber loop standard (e.g., ADSL or VDSL) used by the broadband equipment in the CPE with which it communicates. While line coding and carrier modulation are both useful, it is preferable to employ line coding, as the implementation of the modulator/encoder 22 is simpler. The choice of which digital line code (e.g., bipolar, 4B3T, 16B9Q) or modulation scheme (e.g., QAM, QPSK) to use will be dictated by a multitude of factors, including the theoretical SNR of the line code receiver at the CPE, the distance of the ONU to the furthest CPE, the number of twisted pairs sharing a common sheath, the choice of multiplexing used for downstream and upstream communication and the complexity of the modulator/encoder 22 required to implement the code or modulation scheme.

The modulator/encoder thus applies a chosen line code or carrier modulation scheme to the de-jittered downstream broadband cell stream and produces the multi-level downstream broadband sample stream 110 fed to the wideband digital-to-analog converter 23. It is noted that if a 4B3T line code is used, then delivery of a 25 Mb/s downstream broadband service will result in the downstream broadband sample stream 110 having a sample rate of 18.75 Msample/s, while if a 16-QAM modulation scheme is used, then delivery of the same 25 Mb/s service would result in the downstream broadband sample 110 stream having a sample rate just above 12.5 Msample/s (in order to satisfy the Nyquist criterion), but having a wider dynamic range. Clearly, therefore, the choice of line code or carrier modulation scheme may also be influenced by limitations in bandwidth or dynamic range of the wideband digital-to-analog converter 23.

The wideband digital-to-analog converter 23 subsequently converts the downstream broadband sample stream 110 into analog signal 112 having a frequency range preferably limited by a lower bound which is above the highest narrowband frequency (e.g., 100 kHz) and an upper bound which is still transmittable over a reasonable length of twisted pair cable (e.g., 5–10 MHz). Hence analog signal 112 preferably has a frequency range between about 100 kHz and 5–10 MHz. Analog signal 112 is then amplified by the line driver 27 before being delivered to the combiner circuitry 41 as the downstream braodband analog signal 113.

Downstream operation of the narrowband processing section is now discussed. In accordance with the first preferred embodiment of the invention, each traffic cell associated with a narrowband service has a header containing the ULC address and has a body containing over-sampled data. Therefore, the downstream fiber bandwidth occupied a downstream service is equal to the bit rate of the service, multiplied by an overhead factor (to account for the cell header, equal to 1.17 for ATM cells) and by a bandwidth expansion factor (related to the resolution provided by the over-sampling decoder, usually equal to about 8 or more for good resolution). Hence, for a 64 kb/s voice-band telephony service, the typical downstream fiber bandwidth will be about 0.6 Mb/s, while for a 2 Mb/s DS-1 sevice, it will be on the order of 18.85 Mb/s.

With specific reference to ULC 17 in FIG. 1, the downstream narrowband cell stream 105 enters the downstream narrowband de-jittering queue 31 which serves to compensate for residual multiplex jitter, as was the case with the downstream broadband de-jittering queue 21 in the broadband processing section of ULC 17. The headers of the cells arriving from the downstream narrowband de-jittering queue 31 are then removed by the CDS block 32, producing the downstream narrowband raw bit stream 125 having a bit rate in the just mentioned range of about 0.6 Mb/s to about 18.85 Mb/s.

The over-sampling decoder 35A then accepts the downstream narrowband bit stream 125 at the high bit rate and produces analog signal 126 having a limited and relatively narrow frequency range, preferably between DC and a maximum of about 100 kHz. The analog front end 36 then supplements analog signal 126 with any necessary ring voltages and loop currents consistent with telephony standards. For example, the analog front end 36 may add a ringing waveform 140 received from the ring generator 38, which is under the control of both the control signal 132 received from the control unit 14 and the ring-trip control signal 134 received from the loop status detector 37. The analog front end 36 thus produces the downstream narrowband analog signal 127 fed to the combiner circuitry 41.

Operation of the combiner circuitry is relatively straightforward. The downstream broadband analog signal 113 and the downstream narrowband analog signal 127 pass through respective filters 910,920 which apply respective frequency responses that enhance disjoint regions of the frequency spectrum. The downstream signal 940 output by the summing node 930 and fed to the hybrid 950 is therefore a frequency-division multiplexed interference-free signal. The hybrid 940 interfaces to twisted pair 580 in a standard way, allowing the downstream signal 940 to be sent onto the twisted pair but also allowing the upstream signal 960 to be extracted from the signal arriving on the twisted pair.

Filters 970,980 then enhance the same disjoint regions of the frequency spectrum of the upstream signal 960 as was done by filters 910,920 with respect to downstream signals 113,127. Thus, filter 970 produces the upstream broadband analog signal 115 fed to the wideband analog-to-digital converter 26 in the broadband processing section BB and filter 980 producing the upstream broadband abalog signal 128 fed to the over-sampling encoder 35B in the narrowband processing section NB.

Broadband services generally require a lower data rate in the upstream direction than in the downstream direction and as such the upstream bit rate is not expected to exceed 3 Mb/s. In accordance with the first preferred embodiment of the invention, each traffic cell associated with a broadband service has a meaningful header and body, and therefore a 3 Mb/s service requires an upstream fiber bandwidth of 3 Mb/s.

On the other hand, a narrowband service such as voiceband telephony is generally more symmetric in its data rate demands than a broadband service. In accordance with the first preferred embodiment of the present invention, oversampled data is contained in the body of upstream narrowband cells and therefore the upstream fiber bandwidth occupied by an upstream narrowband service is equal to the bit rate of the service, multiplied by the same overhead factor and bandwidth expansion factor as discussed with respect to the downstream path, resulting in an upstream fiber bandwidth per service ranging from about 0.6 Mb/s to about 18.85 Mb/s.

In the broadband case, the CPE 520 sends a sequence of cells whose bits have been line coded or modulated and which arrive at the wideband analog-to-digital converter 26 as the upstream broadband analog signal 115. The output of the wideband analog-to-digital converter 26 is the upstream broadband sample stream 116 containing samples of line coded or modulated symbols. The demodulator/decoder 25 decodes or demodulates the encoded or modulated signal samples and recovers the cells contained therein. The upstream queue 24 then retains the upstream cells until the multiplexer 15 is ready to accept them. If the upstream queue 24 is full (or close to being full), it signals this fact to the control unit 14 via the queue fill control signal 136. It should be appreciated that if the CPE is not engaged in upstream communication, the cells recovered by the demodulator/decoder 25 will be null cells, which can be discarded by the multiplexer 15, by the queue 24 or by the demodulator/decoder itself.

In the narrowband case, the over-sampling encoder 35B accepts the upstream narrowband analog signal 128 from the combiner circuitry 41, samples it at a very high rate and encodes the incremental variations as the upstream narrowband raw bit stream 129. This narrowband signal may contain samples of data in a format such as PCM, DS-1, ISDN, etc., neither of which is cell-based. The upstream narrowband raw bit stream 129 arrives at the CAS block 34, where it is mapped by the CAS block 34 into a cell stream fed to the upstream narrowband queue 33. The upstream narrowband queue 33 then retains the cells output by the CAS block 34 until the multiplexer 15 is ready to accept them.

At the multiplexer 15, the upstream cell streams 118,131 received respectively from the broadband and narrowband processing sections in ULC 17 are combined together with the cell streams 137,138 received from other ULCs to give the upstream cell stream 122 fed to the upstream outstation 13. If any cells in the upstream cell stream 122 are null cells (as might be produced by the broadband processing section in a given ULC), these may be recognized and discarded by the multiplexer 15.

The upstream outstation 13 then groups the traffic cells from the upstream cell stream 122 into subframes. The upstream outstation 13 also appends appropriate address and control information to the subframe. Specifically, transport cells in the address field identify the ONU 1 as being associated with that subframe. Moreover, under control of the transmit control signal 120 received from the control unit 14, the upstream outstation 13 modifies the content of the transport cells in the control field to signal a request for additional upstream bandwidth triggered by the queue fill control signal 136. Also in response to the transmit control signal 120, the upstream outstation 13 modifies the content of the transport cells in the control field to indicate loop status information (e.g., on-hook, off-hook) provided to the control unit 14 by the loop status detector 37 via control signal 133. These upstream control messages are intended for the control processor 670 in the HDT 510.

Finally, the upstream outstation 13 buffers the newly formed subframes until the transmit control signal 120 received from the control unit 14 signals that the subframe is ready to be transmitted. Each ONU in the PON is instructed to transmit its respective subframes at specific times in order to prevent upstream traffic from other ONUs from being overwritten, hence guard bands may separate the upstream subframes transmitted by the various ONUs in the PON. The HDT can control the exact transmission time of each ONU by sending instructions via the control field in the downstream subframes which are extracted by the downstream outstation 12, decoded by the control unit 14 and sent to the upstream outstation 13 as transmit control signal 120.

OTHER EMBODIMENTS OF THE INVENTION

In accordance with the second preferred embodiment of the present invention, the header of a downstream broadband traffic cell contains the destination ULC address, while the body contains a series of n-bit commands (preferably two-bit commands) for controlling the analog output level of the ONU. The header of an upstream broadband traffic cell contains the source ULC address, while the body contains a sampled and digitized version of the possibly distorted broadband CPE output.

Figure 2:
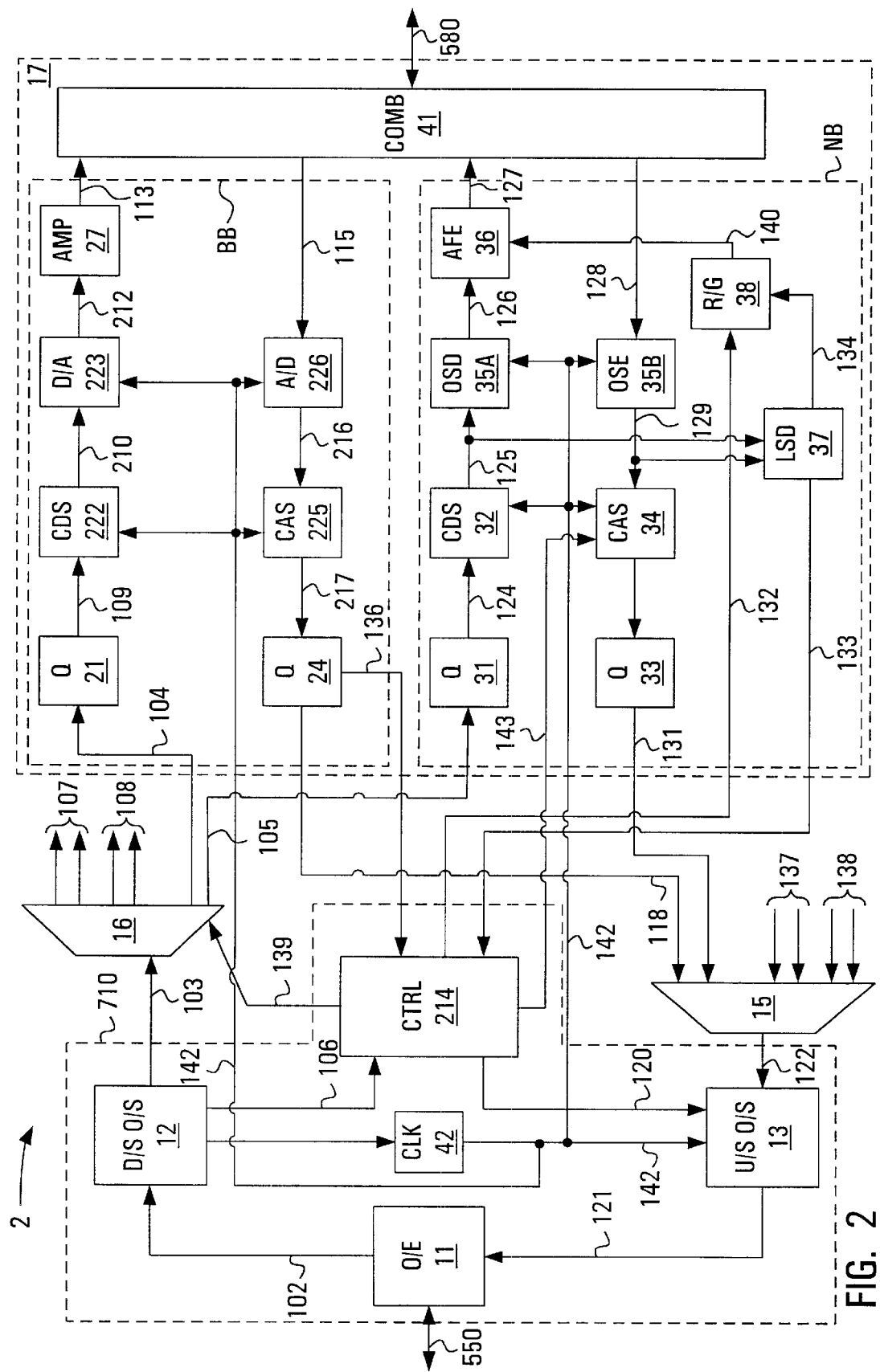
FIG. 2 is a block diagram of an ONU in accordance with a second preferred embodiment of the present invention.

These differences in the significance of the header and body of the traffic cells allow the ONU to be dramatically simplified, as is now described with reference to FIG. 2. Specifically, FIG. 2 shows an ONU 2, wherein the broadband processing section comprises a cell disassembly (CDS) block 222 connected to a two-bit digital-to-analog converter (D/A) 223 for downstream processing, as well as an analog-to-digital converter (A/D) 226 connected to a cell assembly (CAS) block 225 for upstream processing. The ONU 2 also comprises a modified control unit 214.

Considering downstream operation of the broadband processing section BB, the CDS block 222 removes headers from the cells in the de-jittered downstream broadband cell 109 stream output by the downstream broadband de-jittering queue 21, resulting in a downstream broadband raw bit stream 210 delivered to the two-bit digital-to-analog converter 222. The downstream broadband raw bit stream 210 contains pairs of bits representing the level of the ternary or quaternary line coded symbol intended to be delivered to the CPE.

By way of an example in which a 16B9Q line code is utilized, a 25 Mb/s downstream broadband service (having a line coded symbol rate of 14.0625 Msymbol/s) would be encoded by the digital signal processing bank 630 at the HDT into a bit stream inserted into the body of traffic cells of the downstream data stream, wherein each pair of bits in the bit stream represents a line coded symbol. The bit rate to be delivered to the two-bit digital-to-analog converter would therefore equal twice the symbol rate, and therefore the fiber bandwidth occupied by the 25 Mb/s downstream service would equal 28.125 Mb/s, multiplied by the overhead factor associated with the traffic cells, for a total of 33.125 Mb/s in the case of ATM.

If a carrier modulation scheme such as 4-QAM is used instead of line coding, the ONU 2 would preferably comprise a 4-bit wideband digital-to-analog converter (for a better signal-to-quantizing-noise ratio than can be obtained with a 2-bit D/A converter) and at least 4 samples per symbol (to maintain phase information) resulting in 16 bits per symbol, each symbol carrying 2 bits of data. This results in a bandwidth expansion of at least 8 compared to the total downstream bandwidth calculated hereinabove.

Considering now upstream operation of the broadband processing section BB, the upstream broadband analog signal 115 fed by the combiner circuitry 41 to the analog-to-digital converter 226 contains a distorted line coded or carrier modulated version of a broadband data signal transmitted by the CPE. The analog-to-digital converter 226 samples the upstream broadband analog signal 115 at (or above) the Nyquist rate and produces an upstream broadband raw bit stream 216 in which each group of a certain number (e.g., 8) of bits corresponds to a respective sample. The CAS block 225 packages the bits in the upstream broadband raw bit stream 216 into transport cells, adds a header thereto, and produces an upstream broadband cell stream 217 fed to the upstream broadband queue 24. Subsequent upstream processing is effected in a manner identical to that described with reference to FIG. 1.

For a 3 Mb/s upstream narrowband service modulated according to a 16B9Q line code, the symbol rate will be 1.6875 Msymbol/s and therefore the analog-to-digital converter 226 produces the upstream broadband raw bit stream 216 having a bit rate of 27 Mb/s, for an 8-bit analog-to-digital converter operating at the Nyquist rate. When the overhead factor is included to account for the header inserted by the CAS block 234, the upstream fiber bandwidth will be on the order of 31.8 Mb/s in the case of ATM. Once the data is received by the HDT, operations such as filtering and equalization are performed by the digital signal processing bank 630 in order to recover the line code symbols (and the original data) originally transmitted by the CPE.

Figure 3:
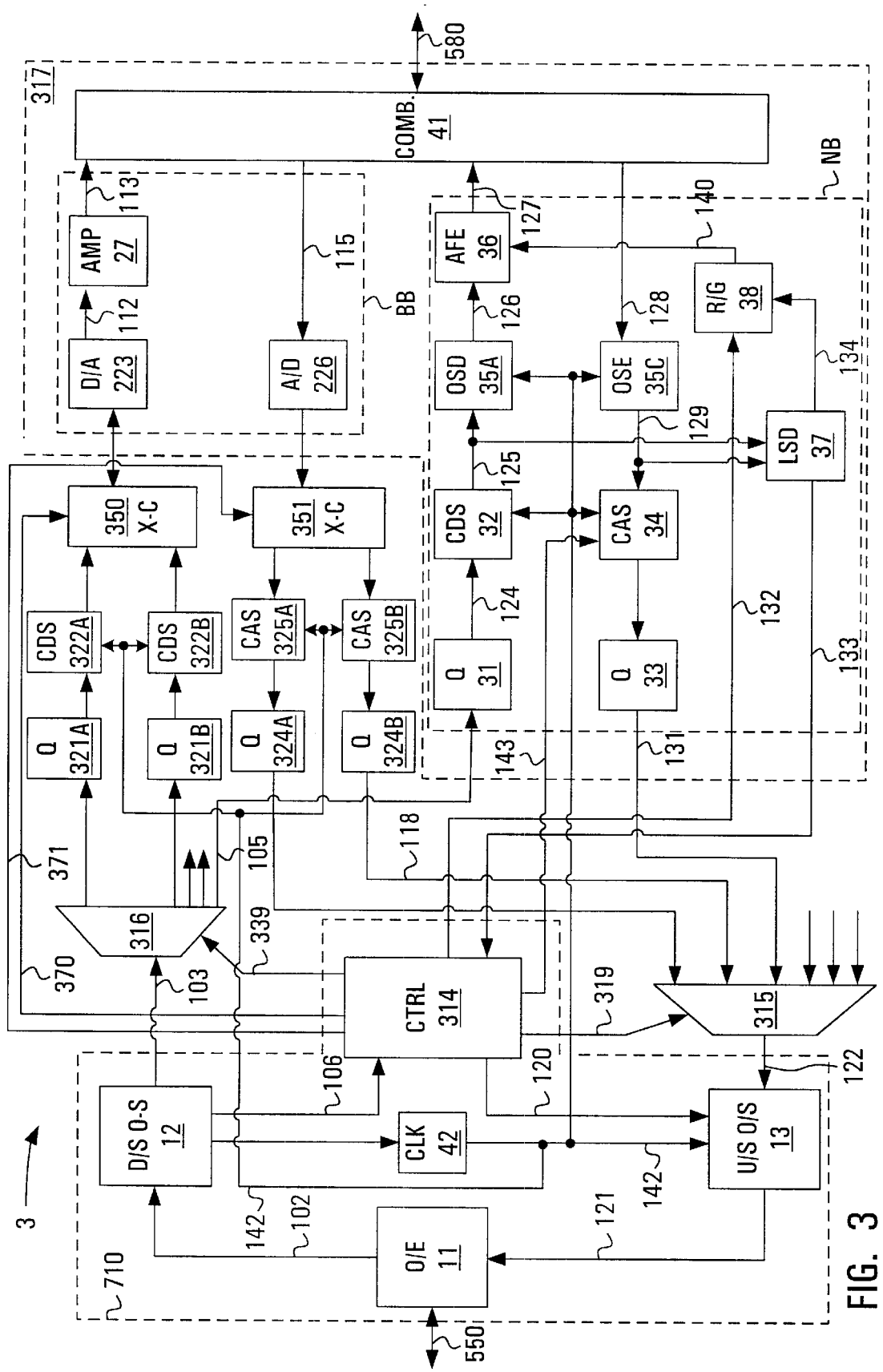
FIG. 3 is a block diagram of an ONU in accordance with a variation of the second preferred embodiment of the present invention.

Reference is now made to FIG. 3, which shows an ONU 3 in accordance with a variation of the second preferred embodiment of the present invention, comprising a number of downstream broadband de-jittering queues 321A,B connected to respective CDS blocks 322A,B, which form a pool of downstream broadband processing resources, and a number of CAS blocks 325A,B connected to respective upstream broadband queues 324A,B, which form a pool of upstream broadband processing resources.

The downstream broadband de-jittering queues 321A,B are fed by a demultiplexer 316, which must know exactly which of the downstream broadband processing paths are free so as to properly route each cell broadband cell in the downstream cell stream 103 to the appropriate processing block. (Narrowband cells continue to be routed in the usual manner.) Routing instructions for the demultiplexer 316 and the cross-connect 350 are provided by a modified mapping selection signal 339 and a routing control signal 370, respectively, both of which are received from the modified control unit 314.

A key component of the ONU 3 is a cross-connect 350 for accepting the cell streams output by the pool of CDS blocks 322A,B and feeding each cell stream to the digital-to-analog converter in the broadband processing section of a selected ULC (e.g., digital-to-analog (D/A) converter 223 in ULC 17). Cross-connect 350 will typically have fewer inputs than outputs and should be capable of routing the output of any CDS block 322A,B towards any individual ULC (for unicast services) or group of ULCs (for multicast/broadcast services). It is to be noted that regardless of the variability in the data rates associated with the individual broadband services delivered to the various CPEs, the CDS blocks 322A,B must produce respective output bit streams having a common bit rate in order that these be accepted by the cross-connect 350.

Finally, ONU 3 also comprises a cross-connect 351, typically with fewer outputs than inputs, connected between the analog-to-digital (A/D) converter 226 in the broadband processing section BB of each ULC and the input to each CAS block 325A,B in the pool of upstream processing resources. Routing instructions for the cross-connect 351 are provided by a modified routing control signal 371 received from the modified control unit 314.

Persons skilled in the art will appreciate that an oversampling decoder and encoder could be used in place of the digital-to-analog and analog-to-digital converters 223,226, in which case the processing required for broadband and narrowband services would be similar, although a large amount of fiber bandwidth would be required. In that case, the narrowband processing section NB in each ULC could be scaled down to resemble the broadband processing section BB and hence pooled processing resources can be used both for broadband and for narrowband services.

Moreover, it is to be noted that virtually all of the complexity associated with line encoding and decoding formerly provided by modulator/encoder 22 and demodulator/decoder 25 in the ONU of FIG. 1 has been removed from the ONU as illustrated in FIGS. 2 and 3. While this has been done at the expense of slightly higher fiber bandwidth requirements and additional processing requirements at the HDT, both of which can generally be met, the ONU 2 is advantageously protected from any future changes in the cell format exchanged with the CPE, and, in addition, the ONU can be embodied in a compact package.

In view of the many further variations of the present invention which may be conceived by persons skilled in the art, its scope is only to be limited by the claims appended hereto.

I claim:

1. An optical network unit (ONU) connectable between an optical fiber and a plurality of twisted pairs, the optical fiber carrying data between a host digital terminal (HDT) and the ONU, the data consisting of broadband and narrowband data destined for the twisted pairs in a downstream direction and originating from the twisted pairs in an upstream direction, the ONU comprising:

an optoelectronic transceiver connectable to the optical fiber, for receiving a downstream optical signal on the optical fiber and converting it into a downstream electronic signal for transmission to a downstream outstation, wherein the downstream electronic signal comprises frames sent by the HDT, each frame comprising a plurality of subframes, each subframe comprising a plurality of fields including an address field, a control field and a traffic field, each field comprising a respective plurality of traffic elements each having a header and a body, the address field of a subframe indicating a destination ONU for that subframe;

a downstream outstation connected to the optoelectronic transceiver for receiving the downstream electronic signal from the optoelectronic transceiver and producing therefrom a downstream data stream, the downstream outstation including circuitry for reading the address field of each subframe in the downstream electronic signal and determining, for each subframe, whether the ONU in which the downstream outstation is located is the destination ONU as indicated in the address field of the subframe and, if so, transmitting the traffic elements in the traffic field of that subframe, thereby to produce the downstream data stream, a demultiplexer connected to the downstream outstation, for receiving the downstream data stream from the downstream outstation and controllably separating it into a plurality of downstream broadband data streams destined for respective ones of the twisted pairs and a plurality of downstream narrowband data streams also destined for respective ones of the plurality of twisted pairs; and for each twisted pair:
a respective broadband processing unit connected to the demultiplexer comprising circuitry for receiving the respective downstream broadband data stream from the demultiplexer and converting it into a respective downstream broadband analog signal destined for said twisted pair;

a respective narrowband processing unit connected to the demultiplexer comprising circuitry for receiving the respective downstream narrowband data stream from the demultiplexer and converting it into a respective downstream narrowband analog signal destined for said twisted pair; and a respective combiner connected to the respective broadband and narrowband processing units and connectable to the twisted pair, comprising circuitry for combining the respective downstream broadband analog signal and the respective downstream narrowband analog signal into a respective downstream composite analog data signal destined for said twisted pair.

2. An ONU according to claim 1, wherein the traffic elements are asynchronous transfer mode (ATM) cells.

3. An ONU according to claim 1, wherein the traffic elements are Internet Protocol (IP) packets.

4. An ONU according to claim 1, wherein the ONU further comprises a control unit connected to the downstream outstation, wherein the downstream outstation further comprises circuitry for reading the control field of each subframe destined for the ONU in which the downstream outstation is located and transmitting downstream ONU control information to the control unit.

5. An ONU according to claim 4, wherein the control unit is further connected to the demultiplexer, wherein the demultiplexer performs routing of traffic elements in the downstream data stream received from the downstream outstation by reading the header of each traffic element received from the downstream outstation and routing said traffic element in accordance with a controllable routing map and wherein the routing map is part of said downstream ONU control information and is received by the demultiplexer from the control unit.

6. An ONU according to claim 5, wherein the downstream outstation further comprises circuitry for extracting synchronization information from the frames and subframes in the downstream electronic signal received from the optoelectronic transceiver and wherein the ONU further comprises a clock recovery unit connected to the downstream outstation and to the broadband and narrowband processing units, for receiving said synchronization information from the downstream outstation, recovering a clock signal therefrom and distributing the recovered clock signal to the broadband and narrowband processing units.

7. An ONU according to claim 4, wherein, for each twisted pair, the respective narrowband processing unit comprises a respective downstream narrowband queue connected to the demultiplexer, for removing residual multiplexing jitter in the respective downstream narrowband data stream.

8. An ONU according to claim 7, wherein, for each twisted pair, the respective narrowband processing unit further comprises a respective narrowband cell disassembly unit connected to the respective downstream narrowband queue, for removing the header of each traffic element received from the respective downstream narrowband queue and producing a respective downstream narrowband oversampled bit stream therefrom.

9. An ONU according to claim 8, wherein the downstream outstation further comprises circuitry for extracting synchronization information from the frames and subframes in the downstream electronic signal received from the optoelectronic transceiver and wherein the ONU further comprises a clock recovery unit connected to the downstream outstation and to each narrowband cell disassembly unit, for receiving said synchronization information from the downstream outstation, recovering a clock signal therefrom and distributing the recovered clock signal to each narrowband cell disassembly unit.

10. An ONU according to claim 8, wherein, for each twisted pair, the respective narrowband processing unit further comprises a respective over-sampling decoder connected to the respective narrowband cell disassembly unit, for producing a respective analog signal that varies in increments having a sign specified by each bit in the respective downstream narrowband bit stream received from the respective narrowband cell disassembly unit.

11. An ONU according to claim 10, wherein the downstream outstation further comprises circuitry for extracting synchronization information from the frames and subframes in the downstream electronic signal received from the optoelectronic transceiver and wherein the ONU further comprises a clock recovery unit connected to the downstream outstation and to each over-sampling decoder, for receiving said synchronization information from the downstream outstation, recovering a clock signal therefrom and distributing the recovered clock signal to each over-sampling decoder.

12. An ONU according to claim 10, wherein, for each twisted pair, the respective narrowband processing unit further comprises a respective analog front end connected between the respective over-sampling decoder and the respective combiner, for formatting the respective analog signal received from the respective over-sampling decoder in accordance with telephony standards.

13. An ONU according to claim 12, wherein, for each twisted pair, the respective narrowband processing unit further comprises a respective ring generator connected to the respective analog front end, for generating a respective ringing voltage waveform, and wherein the respective analog front end adds the respective ringing voltage waveform to the respective analog signal received from the respective over-sampling decoder.

14. An ONU according to claim 13, wherein each ring generator is connected to the control unit and wherein the respective ringing voltage waveforms are controllable by the control unit.

15. An ONU according to claim 12, wherein, for each twisted pair:
the respective combiner further comprises circuitry for receiving a respective upstream composite analog data signal from said twisted pair and for extracting a respective upstream broadband analog signal and a respective upstream narrowband analog signal therefrom,
the respective broadband processing unit further comprises circuitry for receiving the respective upstream broadband analog signal from the respective combiner and converting it into a respective upstream broadband data stream; and
the respective narrowband processing unit further comprises circuitry for receiving the respective upstream narrowband analog signal from the respective combiner and converting it into a respective upstream narrowband data stream;
wherein the ONU further comprises a multiplexer connected to the broadband processing units, to the narrowband processing units and to the interface circuitry, for receiving the upstream broadband data streams from the broadband processing units, for receiving the upstream narrowband data streams from the narrowband processing units, for combining the upstream broadband and narrowband data streams into an upstream data stream and for transmitting the upstream data stream to the interface circuitry; and
wherein the interface circuitry receives the upstream data stream from the multiplexer and converts it into an upstream optical signal for transmission on the optical fiber.

16. An ONU according to claim 15, wherein the interface circuitry further comprises an upstream outstation connected to the multiplexer, to the optoelectronic transceiver and to the control unit, for receiving the upstream data stream from the multiplexer, grouping the traffic elements contained therein into upstream subframes and controllably transmitting said upstream subframes in response to a transmit control signal received from the control unit, thereby to produce an upstream electronic signal fed to the optoelectronic transceiver and wherein the optoelectronic transceiver further comprises an electro-optic transceiver for receiving the upstream electronic signal from the upstream outstation and converting it into the upstream optical signal.

17. An ONU according to claim 16, wherein, for each twisted pair, the respective narrowband processing unit further comprises a respective over-sampling encoder connected to the respective combiner, for receiving the respective upstream narrowband analog signal and producing a respective upstream narrowband over-sampled bit stream therefrom.

18. An ONU according to claim 17, wherein the downstream outstation further comprises circuitry for extracting synchronization information from the frames and subframes in the downstream electronic signal received from the optoelectronic transceiver and wherein the ONU further comprises a clock recovery unit connected to the downstream outstation and to each over-sampling encoder, for receiving said synchronization information from the downstream outstation, recovering a clock signal therefrom and distributing the recovered clock signal to each over-sampling encoder.

19. An ONU according to claim 17, wherein, for each twisted pair, the respective narrowband processing unit further comprises:
a respective ring generator connected to the analog front end for generating a respective ringing voltage waveform, wherein the respective analog front end adds the respective ringing voltage waveform to the analog signal received from the respective over-sampling decoder; and
a respective loop status detector connected to the respective narrowband cell disassembly unit, to the respective over-sampling encoder and to the respective ring generator, for receiving the respective upstream and downstream narrowband over-sampled bit streams, determining the status of said twisted pair and controlling the respective ringing voltage waveform through the respective ring generator in accordance with the status of said twisted pair.

20. An ONU according to claim 19, wherein, for each twisted pair, the respective loop status detector is further connected to the control unit, for transmitting the status of said twisted pair thereto.

21. An ONU according to claim 19, wherein each upstream subframe comprises a control field containing upstream control information including the status of the twisted pairs as determined by the loop status detector in each narrowband processing unit.

22. An ONU according to claim 17, wherein, for each twisted pair, the respective narrowband processing unit further comprises a respective narrowband cell assembly unit connected between the respective over-sampling encoder and the multiplexer, for arranging the bits in the respective upstream over-sampled bit stream received from the respective over-sampling encoder into the bodies of successive traffic elements and appending a header to each traffic element so created, thereby to produce the respective narrowband upstream data stream fed to the multiplexer.

23. An ONU according to claim 22, wherein, for each twisted pair, the respective narrowband cell assembly unit is connected to the control unit and wherein the headers appended by the respective narrowband cell assembly unit comprise information controllable by the control unit.

24. An ONU according to claim 22, wherein the downstream outstation further comprises circuitry for extracting synchronization information from the frames and subframes in the downstream electronic signal received from the optoelectronic transceiver and wherein the ONU further comprises a clock recovery unit connected to the downstream outstation and to each narrowband cell assembly unit, for receiving said synchronization information from the downstream outstation, recovering a clock signal therefrom and distributing the recovered clock signal to each narrowband cell assembly unit.

25. An ONU according to claim 22, wherein, for each twisted pair, the respective narrowband processing unit further comprises a respective upstream narrowband queue connected between the respective narrowband cell assembly unit and the multiplexer for temporarily storing the traffic elements output by the respective narrowband cell assembly unit prior to delivery to the multiplexer.

26. An ONU according to claim 25, wherein, for each twisted pair, the respective broadband processing unit comprises a respective downstream broadband queue connected to the demultiplexer for removing residual multiplexing jitter in the respective downstream broadband data stream.

27. An ONU according to claim 26, wherein, for each twisted pair, the respective downstream broadband queue is sufficiently large to accommodate all the traffic elements in the traffic field of the largest subframe that can be destined for the ONU.

28. An ONU according to claim 26, wherein, for each twisted pair, the respective broadband processing unit further comprises a respective modulator/encoder connected to the respective downstream broadband queue for formatting the output of the downstream broadband queue in accordance with a respective selectable signalling format.

29. An ONU according to claim 28, wherein, for each twisted pair, the respective selectable signalling format is selected from the group consisting of at least one line code and at least one modulation scheme.

30. An ONU according to claim 28, wherein, for each twisted pair, the respective modulator/encoder is connected to the control unit, wherein the downstream ONU control information includes the respective selectable signalling format and wherein the control unit is adapted to transmit the respective selectable signalling format to the respective modulator/encoder.

31. An ONU according to claim 28, wherein the downstream outstation further comprises circuitry for extracting synchronization information from the frames and subframes in the downstream electronic signal received from the optoelectronic transceiver and wherein the ONU further comprises a clock recovery unit connected to the downstream outstation and to each modulator/encoder, for receiving said synchronization information from the downstream outstation, recovering a clock signal therefrom and distributing the recovered clock signal to each modulator/encoder.

32. An ONU according to claim 28, wherein, for each twisted pair, the respective broadband processing unit further comprises a respective digital-to-analog converter connected between the respective modulator/encoder and the respective combiner, for converting the signal received from the respective modulator/encoder into the respective downstream broadband analog signal fed to the respective combiner.

33. An ONU according to claim 32, wherein, for each twisted pair, the respective broadband processing unit further comprises a respective amplifier connected between the respective digital-to-analog converter and the respective combiner for amplifying the respective downstream broadband analog signal produced by the respective digital-to-analog converter prior to entering the respective combiner.

34. An ONU according to claim 32, wherein, for each twisted pair, the respective broadband processing unit further comprises a respective analog-to-digital converter connected to the respective combiner, for receiving the respective upstream broadband analog signal and producing a respective upstream broadband sample stream therefrom.

35. An ONU according to claim 34, wherein the downstream outstation further comprises circuitry for extracting synchronization information from the frames and subframes in the downstream electronic signal received from the optoelectronic transceiver and wherein the ONU further comprises a clock recovery unit connected to the downstream outstation and to each analog-to-digital converter, for receiving said synchronization information from the downstream outstation, recovering a clock signal therefrom and distributing the recovered clock signal to each analog-to-digital converter.

36. An ONU according to claim 34, wherein, for each twisted pair, the respective broadband processing unit further comprises a respective demodulator/decoder connected between the respective analog-to-digital converter and the multiplexer, for formatting the samples in the respective upstream sample received from the respective analog-to-digital converter into traffic elements, thereby to produce the respective broadband upstream data stream fed to the multiplexer.

37. An ONU according to claim 36, wherein, for each twisted pair, the respective modulator/encoder is connected to the control unit, wherein the downstream ONU control information includes the signalling format used by the respective demodulator/decoder and wherein the control unit transmits the signalling format to the respective demodulator/decoder.

38. An ONU according to claim 36, wherein the downstream outstation further comprises circuitry for extracting synchronization information from the frames and subframes in the downstream electronic signal received from the optoelectronic transceiver and wherein the ONU further comprises a clock recovery unit connected to the downstream outstation and to each demodulator/decoder, for receiving said synchronization information from the downstream outstation, recovering a clock signal therefrom and distributing the recovered clock signal to each demodulator/decoder.

39. An ONU according to claim 36, wherein, for each twisted pair, the respective broadband processing unit further comprises a respective upstream broadband queue connected between the respective demodulator/decoder and the multiplexer for temporarily storing the traffic elements output by the respective demodulator/decoder prior to delivery to the multiplexer.

40. An ONU according to claim 39, wherein, for each twisted pair, the respective upstream broadband queue is connected to the control unit and wherein the respective upstream broadband queue comprises circuitry for sending a control message to the control unit when the occupancy of the respective upstream broadband queue reaches a respective predetermined level.

41. An ONU according to claim 40, wherein each upstream subframe comprises a control field containing upstream control information indicating whether the occupancy of any upstream broadband queue has reached the respective predetermined level.

42. An ONU according to claim 26, wherein, for each twisted pair, the respective broadband processing unit further comprises a respective broadband cell disassembly unit connected to the respective downstream broadband queue for removing the header of each traffic element received from the respective downstream broadband queue and producing a respective downstream broadband bit stream therefrom.

43. An ONU according to claim 42, wherein the downstream outstation further comprises circuitry for extracting synchronization information from the frames and subframes in the downstream electronic signal received from the optoelectronic transceiver and wherein the ONU further comprises a clock recovery unit connected to the downstream outstation and to each broadband cell disassembly unit, for receiving said synchronization information from the downstream outstation, recovering a clock signal therefrom and distributing the recovered clock signal to each broadband cell disassembly unit.

44. An ONU according to claim 42, wherein, for each twisted pair, the respective broadband processing unit further comprises a respective digital-to-analog converter connected between the respective broadband cell disassembly unit and the respective combiner, for converting the signal received from the respective broadband cell disassembly unit into the respective downstream broadband analog signal fed to the combiner.

45. An ONU according to claim 44, wherein the downstream outstation further comprises circuitry for extracting synchronization information from the frames and subframes in the downstream electronic signal received from the opto-electronic transceiver and wherein the ONU further comprises a clock recovery unit connected to the downstream outstation and to each digital-to-analog converter, for receiving said synchronization information from the downstream outstation, recovering a clock signal therefrom and distributing the recovered clock signal to each digital-to-analog converter.

46. An ONU according to claim 44, wherein, for each twisted pair, the respective broadband processing unit further comprises a respective amplifier connected between the respective digital-to-analog converter and the respective combiner for amplifying the respective downstream broadband analog signal produced by the respective digital-to-analog converter prior to entering the respective combiner.

47. An ONU according to claim 44, wherein, for each twisted pair, the respective broadband processing unit further comprises a respective analog-to-digital converter connected to the respective combiner, for receiving the respective upstream broadband analog signal and producing a respective upstream broadband bit stream therefrom.

48. An ONU according to claim 47, wherein the downstream outstation further comprises circuitry for extracting synchronization information from the frames and subframes in the downstream electronic signal received from the opto-electronic transceiver and wherein the ONU further comprises a clock recovery unit connected to the downstream outstation and to each analog-to-digital converter, for receiving said synchronization information from the downstream outstation, recovering a clock signal therefrom and distributing the recovered clock signal to each analog-to-digital converter.

49. An ONU according to claim 47, wherein, for each twisted pair, the respective broadband processing unit further comprises a respective broadband cell assembly unit connected between the respective analog-to-digital converter and the multiplexer, for arranging the bits in the respective upstream broadband bit stream received from the respective analog-to-digital converter into the bodies of successive traffic elements and appending a header to each traffic element so created, thereby to produce the respective broadband upstream data stream fed to the multiplexer.

50. An ONU according to claim 49, wherein the downstream outstation further comprises circuitry for extracting synchronization information from the frames and subframes in the downstream electronic signal received from the opto-electronic transceiver and wherein the ONU further comprises a clock recovery unit connected to the downstream outstation and to each broadband cell assembly unit, for receiving said synchronization information from the downstream outstation, recovering a clock signal therefrom and distributing the recovered clock signal to each broadband cell assembly unit.

51. An ONU according to claim 49, wherein, for each twisted pair, the respective broadband cell assembly unit is connected to the control unit and wherein the headers appended by the respective broadband cell assembly unit comprise information controllable by the control unit.

52. An ONU according to claim 49, wherein, for each twisted pair, the respective broadband processing unit further comprises a respective upstream broadband queue connected between the respective broadband cell assembly unit and the multiplexer for temporarily storing the traffic elements output by the respective broadband cell assembly unit prior to delivery to the multiplexer.

53. An ONU according to claim 4, wherein, for each twisted pair, the respective downstream narrowband queue is sufficiently large to accommodate all the traffic elements in the traffic field of the largest subframe that can be destined for the ONU.

54. An ONU according to claim 16, wherein each upstream subframe comprises an address field identifying the ONU transmitting the subframe.

55. An ONU according to claim 22, wherein the downstream outstation further comprises circuitry for extracting synchronization information from the frames and-subframes in the downstream electronic signal received from the opto-electronic transceiver and wherein the ONU further comprises a clock recovery unit connected to the downstream outstation and to each digital-to-analog converter, for receiving said synchronization information from the downstream outstation, recovering a clock signal therefrom and distributing the recovered clock signal to each digital-to-analog converter.

56. An optical network unit (ONU) connectable between an optical fiber and a plurality of twisted pairs, the optical fiber carrying data between a host digital terminal (HDT) and the ONU, the data consisting of broadband and narrowband data destined for the twisted pairs in a downstream direction and originating from the twisted pairs in an upstream direction, the ONU comprising:

interface circuitry for connection to the optical fiber, for receiving a downstream optical signal on the optical fiber and for extracting a downstream data stream therefrom;

a demultiplexer connected to the interface circuitry, for receiving the downstream data stream from the interface circuitry and separating it into a plurality of intermediate downstream broadband data streams and a plurality of downstream narrowband data streams;

a downstream broadband processing pool connected to the demultiplexer, including: a plurality of first broadband processing units, each first broadband processing unit being adapted to receive and process a corresponding are of the intermediate downstream broadband data streams from the demultiplexer; and a common cross-connect having a plurality of inputs and a plurality of outputs, the plurality of inputs being connected to the first broadband processing units, the cross-connect being adapted to selectably route each processed intermediate downstream broadband data streams to at least one corresponding one of its outputs;

for each twisted pair:
a respective second broadband processing unit connected to a respective one of the outputs of the cross-connect, including circuitry for receiving the respective processed intermediate downstream broadband data stream from the downstream broadband processing pool and converting it into a respective downstream broadband analog signal destined for said twisted pair;

a respective narrowband processing unit connected to the demultiplexer, comprising circuitry for receiving the respective downstream narrowband data stream from the demultiplexer and converting it into a respective downstream narrowband analog signal destined for said twisted pair; and a respective combiner connected to the respective broadband processing unit, to the respective narrowband processing units and connectable to the twisted pair, including circuitry for combining the respective downstream broadband analog signal and the respective downstream narrowband analog signal into a respective downstream composite analog data signal destined for said twisted pair.

57. An ONU according to claim 56, wherein the cross-connect selectably routes at least one of the the processed intermediate downstream broadband data streams to at least two corresponding ones of its outputs.

58. An ONU according to claim 56, wherein, for each twisted pair:

the respective combiner further comprises circuitry for receiving a respective upstream composite analog data signal from said twisted pair and for extracting a respective upstream broadband analog signal and a respective downstream narrowband analog signal therefrom, the respective second broadband processing unit further comprises circuitry for receiving the respective upstream broadband analog signal from the respective combiner and converting it into a respective upstream broadband data stream; and the respective narrowband processing unit further comprises circuitry for receiving the respective upstream narrowband analog signal from the respective combiner and converting it into a respective upstream narrowband data stream;

wherein the ONU further comprises:

an upstream broadband processing pool connected to the second broadband processing units and to the narrowband processing units, comprising: a second cross-connect having a plurality of inputs and a plurallity of outputs, the inputs being converted to the second broadband processing units, the second cross-connect being adapted to selectably assign one from a group of at least one corresponding upstream broadband data stream to each of a plurality of intermediate broadband data streams; a plurality of third broadband processing units, each third upstream broadband processing unit being adapted to receive a corresponding one of the intermediate upstream broadband data streams from the outputs of the second cross-connect;

a multiplexer connected to the upstream broadband processing pool, to the narrowband processing units and to the interface circuitry, for receiving the processed intermediate upstream broadband data streams from the third upstream broadband processing units, for receiving the upstream narrowband data streams from the narrowband processing units, for combining the received upstream broadband and narrowband data streams into an upstream data stream and for transmitting the upstream data stream to the interface circuitry;

wherein the interface circuitry is adapted to receive the upstream data stream from the multiplexer and convert it into an upstream optical signal for transmission on the optical fiber.

* * * * *